US009932019B2

(12) United States Patent
Hassounah (10) Patent No.: US 9,932,019 B2
(45) Date of Patent: Apr. 3, 2018

(54) ROBOT ASSISTED MODULAR BATTERY INTERCHANGING SYSTEM

(71) Applicant: Ample Inc., San Francisco, CA (US)

(72) Inventor: Khaled Hassounah, San Francisco, CA (US)

(73) Assignee: Ample, Inc., San Francisco, CA (US)

( * ) Notice: Subject to any disclaimer, the term of this patent is extended or adjusted under 35 U.S.C. 154(b) by 0 days.

(21) Appl. No.: 15/667,830

(22) Filed: Aug. 3, 2017

(65) Prior Publication Data

US 2017/0355354 A1    Dec. 14, 2017

Related U.S. Application Data

(63) Continuation of application No. 15/185,986, filed on Jun. 17, 2016.

(60) Provisional application No. 62/180,686, filed on Jun. 17, 2015.

(51) Int. Cl.
*B60S 5/06* (2006.01)
*B60L 11/18* (2006.01)

(52) U.S. Cl.
CPC .............. *B60S 5/06* (2013.01); *B60L 11/1822* (2013.01); *Y02T 90/124* (2013.01)

(58) Field of Classification Search
CPC ....... B60L 11/1822; B60S 5/06; Y02T 90/124
See application file for complete search history.

(56) References Cited

U.S. PATENT DOCUMENTS

| 4,102,273 | A  | 7/1978  | Merkle et al. |
| 5,825,981 | A  | 10/1998 | Matsuda |
| 7,066,291 | B2 | 6/2006  | Martins et al. |
| 7,139,642 | B2 | 11/2006 | Kamoto et al. |
| 8,006,793 | B2 | 8/2011  | Heichal et al. |
| 8,517,132 | B2 | 8/2013  | Heichal et al. |
| 8,573,335 | B2 | 11/2013 | Rudakevych |
| 8,868,235 | B2 | 10/2014 | Zhao et al. |
| 8,869,384 | B2 | 10/2014 | Park et al. |
| 9,016,417 | B2 | 4/2015  | Ohgitani et al. |
| 2004/0093650 | A1 | 5/2004 | Martins et al. |
| 2011/0113609 | A1 | 5/2011 | Berdelle-Hilge et al. |
| 2013/0076902 | A1 | 3/2013 | Gao et al. |
| 2013/0226345 | A1 | 8/2013 | Zhao et al. |

(Continued)

FOREIGN PATENT DOCUMENTS

FR    2989522 A1 * 10/2013 .......... B60L 11/1822

OTHER PUBLICATIONS

Machine translation of FR 2989522 from espacenet.*

*Primary Examiner* — Mark C Hageman
(74) *Attorney, Agent, or Firm* — Intrinsic Law Corp.

(57) ABSTRACT

Systems and apparatus for a robotic charging station for charging a battery of an electric vehicle. A semi-autonomous portable robot is programmed to interchange depleted rechargeable batteries disposed in an electric or hybrid vehicle. Portable battery pod dispenses batteries to semi-autonomous portable robot for swap. Semi-autonomous portable robot uses navigational sensors to transport battery to predetermined position at the battery interchange location. Battery disposition and configuration data are wirelessly communicated by battery pod to semi-autonomous portable robot. Battery pod is also in electrical communication with vehicle for timely latching and unlatching of battery modules.

12 Claims, 9 Drawing Sheets

(56) References Cited

U.S. PATENT DOCUMENTS

2015/0151723 A1 6/2015 Yang et al.
2016/0107619 A1* 4/2016 Clarke ..................... B60S 5/06
 29/402.08

* cited by examiner

ROBOT ASSISTED MODULAR BATTERY INTERCHANGING SYSTEM

RELATED APPLICATIONS

This application is a continuation of U.S. patent application Ser. No. 15/185,986, titled "Robot Assisted Modular Battery Interchanging System," filed on Jun. 17, 2016, which claims priority to U.S. Provisional Application No. 62/180,686, entitled "Robot Assisted Modular Battery Interchanging System," filed on Jun. 17, 2015, which is hereby incorporated by reference.

TECHNICAL FIELD

The present invention relates generally to a robotically operated vehicle charging station for an electric or extended-range electric vehicle. More particularly, a robot is programmed to interchange battery packs and modules in situ at any remote location thereby obviating the need for charging stations.

BACKGROUND

Various types of automotive vehicles, such as electric vehicles (EVs), extended-range electric vehicles (EREVs), and hybrid electric vehicles (HEVs) are equipped with an energy storage system that requires periodic charging. Typically, this energy storage system may be charged by connecting it to a power source, such as an alternating current (AC) supply line. While it may be advantageous to recharge the vehicle's energy storage system before or after each vehicle use, current systems require the vehicle operator to manually plug the power supply line into the vehicle. Such manual operation may not always be convenient for the vehicle operator, which may result in missed charging instances and/or subsequently degraded vehicle performance.

Vehicles have become culturally integral and indispensable to the modern economy. Unfortunately, fossil fuels—typically used to power such vehicles—have manifold drawbacks, including but not limited to: a dependence on limited foreign sources of oil and natural gas; foreign sources are often in volatile geographic locations; and, most egregious, fossil fuels produce pollution and climate change.

One way to address these problems is to increase the fuel economy of these vehicles. Recently, gasoline-electric hybrid vehicles have been introduced, which consume substantially less fuel than their traditional internal combustion counterparts, i.e., they have better fuel economy. However, gasoline-electric hybrid vehicles do not eliminate the need for fossil fuels, as they still require an internal combustion engine in addition to the electric motor.

Another way to address this problem is to use renewable resource fuels such as bio-fuels. While successful in other countries, such as Brazil, bio-fuels remain more expensive than their antiquated counterparts. Yet, more importantly, bio-fuels are equally contributing to greenhouse gasses and arguably leave a larger carbon footprint, when analyzed from the totality of production.

A more popular approach has been to use clean[er] technologies, such as electric motors powered by fuel cells or batteries. However, many of these clean technologies are not yet practical. For example, fuel cell vehicles are still under development and are expensive. Hydrogen powered fuel cells first require the chemical extraction (via electrolysis) of diatomic hydrogen ($H_2$) and transportation thereof inside a vehicle, which is inherently dangerous.

The greatest impediment to EVs, particularly to extended range EVs, has been and remains to be antediluvian battery technology. Battery technology has experienced a modicum of recent progression; however, batteries contribute as much as 40% to the cost of a new vehicle. Rechargeable battery technology has simply not advanced to the point where mass-produced and cost-effective batteries can power electric vehicles for long distances.

Present electro-chemical (rechargeable batteries) technology does not provide an energy density comparable to chemically stored sources. Gasoline, diesel, ethanol, methanol, etc. all have energy densities close to two orders of magnitude greater than lithium ion rechargeable batteries. Therefore, even on a typical fully charged electric vehicle battery, the electric vehicle may only be able to travel about 70 miles (EPA Nissan Leaf) before needing to be recharged. For non-hybrid vehicles, range is a strict limited factor conjuring images of becoming stranded with no charging capacity nearby.

Furthermore, batteries can take many hours to recharge and may need to be recharged overnight. State and local government have recognized a need for charging stations to help mitigate the drawbacks (impediments, more accurately) to electric vehicle usage and proliferation. An electric vehicle charging station is an element in an infrastructure that supplies electric energy for the recharging of electric vehicles, such as plug-in electric vehicles, including all-electric cars, neighborhood electric vehicles and plug-in hybrids.

As plug-in hybrid electric vehicles and electric vehicle ownership is expanding, there is a growing need for widely distributed publicly accessible charging stations, some of which support faster charging at higher voltages and currents than are available from residential electric vehicle supply equipment (EVSE). Many charging stations are on-street facilities provided by electric utility companies or located at retail shopping centers and operated by many private companies. These charging stations provide one or a range of heavy duty or special connectors that conform to the variety of electric charging connector standards.

Alas, charging stations are not ubiquitous. And, despite higher current capacity thereby reducing recharge times, quick charges may take several hours. Therefore, present EV owners must plan trips carefully and prudently. Additionally, longer trips may simply be precluded for lack of infrastructure and paucity of vehicle range.

Accordingly, the present inventors have recognized the need for a viable "quick refuel" system. The present inventors have also recognized the desirability of a system exhibiting portability and versatility, as present charging system are geographically fixed and tied to the electrical grid. The inventors also recognize that any new system must be easily accessible and usable by any member of the general population.

Therefore, there exists a need for user-friendly system and method for interchanging modular battery pack at any remote location. The present disclosure contemplates the novel fabrication and employment of a robotic portable device programmed to swap out vehicle batteries with minimal assistance, as well as practical methods for the application thereof and remedying these and/or other associated problems.

SUMMARY

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings.

An aspect of the invention is directed to a portable exchange robot for exchanging a battery module in a vehicle. The robot comprises a microprocessor; a battery tray configured to hold a modular battery unit; a lift in mechanical communication with said battery tray, said lift to raise and lower said battery tray; a motor in mechanical communication with said lift and in electrical communication with said microprocessor, said motor to raise and lower said lift; a plurality of wheels that propel said portable exchange robot; a navigation system in electrical communication with said microprocessor and at least one of said plurality of wheels to drive the dispensary robot between a modular battery dispensary and a vehicle; and a wireless communication system in electrical communication with said dispensary and said vehicle.

Another aspect of the invention is directed to a battery dispensary robot comprising a microprocessor; a battery dispensary to retain modular battery units, said battery dispensary defined in a body of said dispensary robot; a plurality of wheels that propel said dispensary robot; and a navigation system in electrical communication with said microprocessor and at least one of said plurality of wheels to drive said battery dispensary robot to a first location proximal to a vehicle.

Another aspect of the invention is directed to a method of exchanging battery modules in a vehicle. The method comprises positioning a battery exchange robot under a depleted battery module of a modular battery in said vehicle; with said battery exchange robot, unloading said depleted battery module from said modular battery in said vehicle; returning said depleted battery module from said battery exchange robot to a modular battery dispensary; with said battery exchange robot, retrieving a charged battery module from said modular battery dispensary; and loading said charged battery module in said modular battery of said vehicle.

This overview is intended to provide an overview of subject matter of the present patent application. It is not intended to provide an exclusive or exhaustive explanation of the invention. Further limitations and disadvantages of conventional and traditional approaches will become apparent to one of skill in the art, through comparison of such systems with some aspects of the present invention as set forth in the remainder of the present application with reference to the drawings.

BRIEF DESCRIPTION OF THE DRAWINGS

For a fuller understanding of the nature and advantages of the present invention, reference is made to the following detailed description of preferred embodiments and in connection with the accompanying drawings, in which.

DETAILED DESCRIPTION

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

This disclosure provides a robot-assisted modular battery interchanging system compatible with electric or extended-range electric vehicles. Specifically, an autonomous robot is programmed to interchange battery packs and modules in situ at any remote location thereby obviating the need for charging stations.

In order to overcome the above described drawbacks, a network of moveable charge spots and battery exchange stations are deployed to provide the EV (electric vehicle) user with the ability to keep his or her vehicle charged and available for use at all times. Some embodiments provide a system and method to quickly exchange, a spent depleted (or substantially discharged) battery pack for a fully charged (or substantially fully charged) battery pack at a battery exchange station. The quick exchange is performed in a period of time significantly less than that required to recharge a battery. Thus, the long battery recharge time may no longer be relevant to a user of an electric vehicle who is traveling beyond the range of the battery.

Furthermore, the cost of the electric vehicle can be substantially reduced because the battery of the electric vehicle can be separated from the initial cost of the vehicle. For example, the battery can be owned by a party other than the user of the vehicle, such as a financial institution or a service provider. Thus, the batteries may be treated as components of the electric recharge grid (ERG) infrastructure to be monetized over a long period of time, and not a part of the vehicle purchased by the consumer.

A robot in this context should mean a mobile robot, which can be propelled by wheels, "legs," or other means. The expression autonomous robot hereinafter means a robot that is self-governed such that the robot, on a given order, manages itself to find its way to a target location and carry out an ordered operation, either with or without off board computational assistance, such as that given from a battery pod, which will be discussed in greater detail later in the disclosure. Also, batteries and battery modules may be used interchangeably. Strictly speaking, battery modules are typically bundled batteries; however, this distinction is moot as both are within the scope of the present invention and functionally indistinct.

Autonomous robots have experienced a rise in popularity recently given the success of iRobot™, a self-controlled clean robot, and the Kiva robots used at Amazon's fulfillment centers. Autonomous robots are automatically controlled. In one aspect, these robots can be arranged to automatically follow a track, which sometimes is invisible. Such robots carry means for steering along a predefined pathway. In a second more sophisticated aspect of these mobile robots, they are equipped with an onboard computer by which they perform tasks of their own by a preprogrammed calculation.

Actual path planning can also be done by a host computer, not by the robot. To program the robot the operator first defines valid points in the area where the robot is to operate. Then the robot automatically finds its way along the path with the help of sensors mounted on the robot. Since the actions of the robot always are preprogrammed, the robot cannot be regarded as being autonomous but merely automatic, both of which are consistent and within the scope of the present invention.

Embodiments of this disclosure provide for a means to swap an electric car's battery in an efficient, inexpensive manner without requiring significant human effort or intervention. To this end, the inventors disclose a mobile robot system comprising an autonomous mobile robot and a mobile operations platform (also called a battery pod or mobile operations platform later in the disclosure).

The autonomous robot carries an on-board computer and comprises means for navigation, environmental sensing, communication and battery module transportation/installation. The mobile operation platform is typically designed to perform one or a plurality of related predetermined operations, such as, dispensing charged batteries, performing electrical communication with a main server, and performing wireless communication with the autonomous robot.

The system is designed to dispatch the autonomous robot and mobile operations platform to a predetermined geographical location (typically remote) whereby the robot navigates to a vehicle for the purpose of interchanging depleted rechargeable batteries. In some embodiments, through assistance from the mobile operations platform, the robot performs the desired operations.

Figure 1:
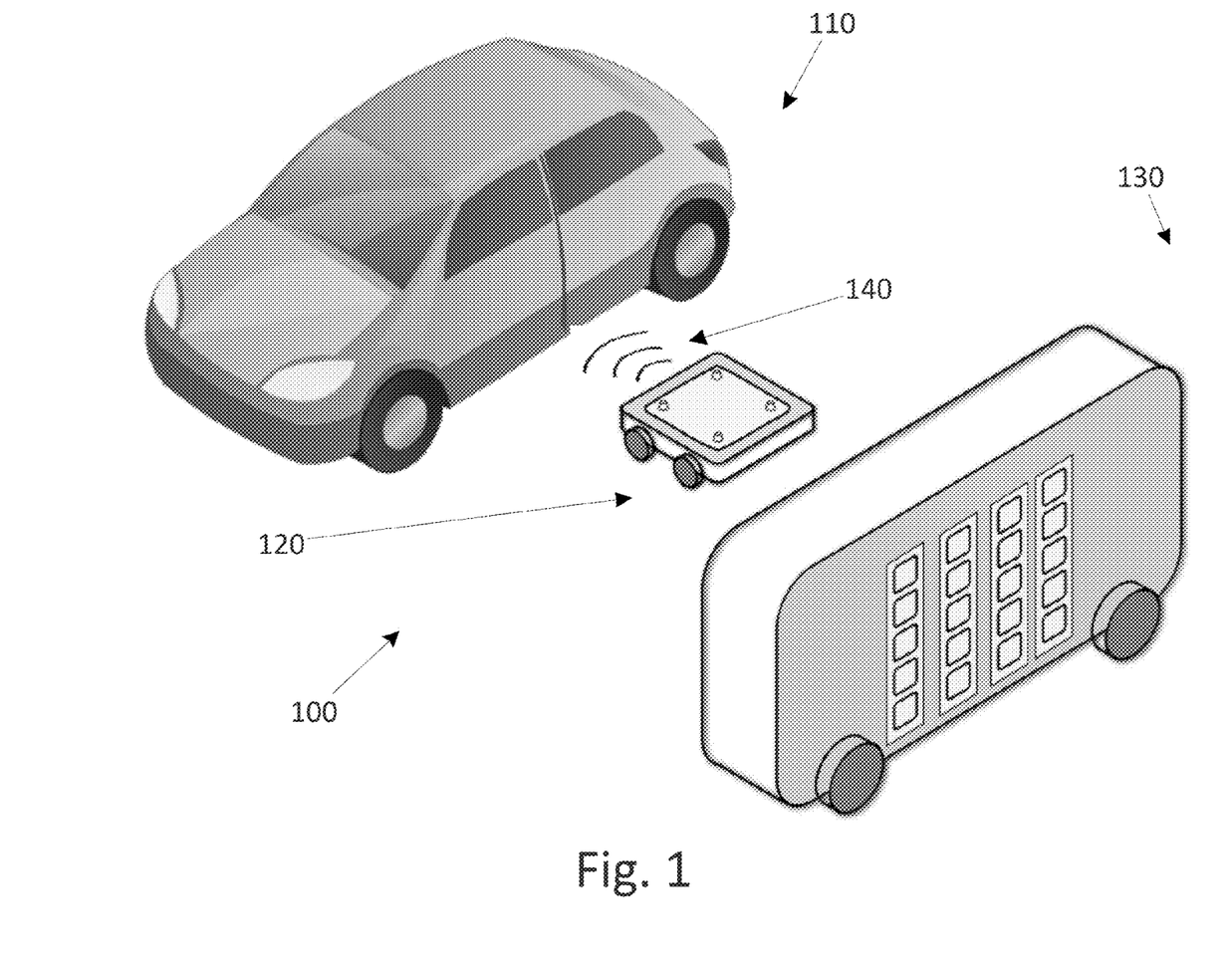
FIG. 1 projects an isometric view of a robot assisted modular battery interchanging system, in accordance with some embodiments of the disclosure provided herein.

FIG. 1 projects an isometric view of a robot assisted modular battery interchanging system 100, in accordance with some embodiments of the present disclosure. Robot assisted modular battery interchanging system 100 comprises mobile operations platform 130 and robot 120 (automobile 110 is demonstrative).

In the most general sense, mobile operations platform 130 is a device responsible for storing batteries, dispensing them when needed, and storing returned empty batteries. In one or more embodiments, a mobile operation platform 130 charges (or maintains pursuant to a battery tender) discharged batteries in place or simply acts as a transport container for batteries to be charged elsewhere, in other embodiments.

Robot 120 can be either autonomous or automatic whereby it receives a more explicit instruction code set from mobile operations platform 130. In practice, robot 120 uses a relative position sensing technology 140 (such as ultrasonic multilateration, ultrasonic radar, infrared multilateration, LiDAR, or any similar technology) to locate itself relative to automobile 110. Using its location relative to a fixed point on the automobile 110 and instructions wirelessly communicated from mobile operations platform 130, robot 120 positions itself under the car preparing for battery (module) extraction. System operations and methods will be discussed in more detail later in the disclosure.

Figure 2:
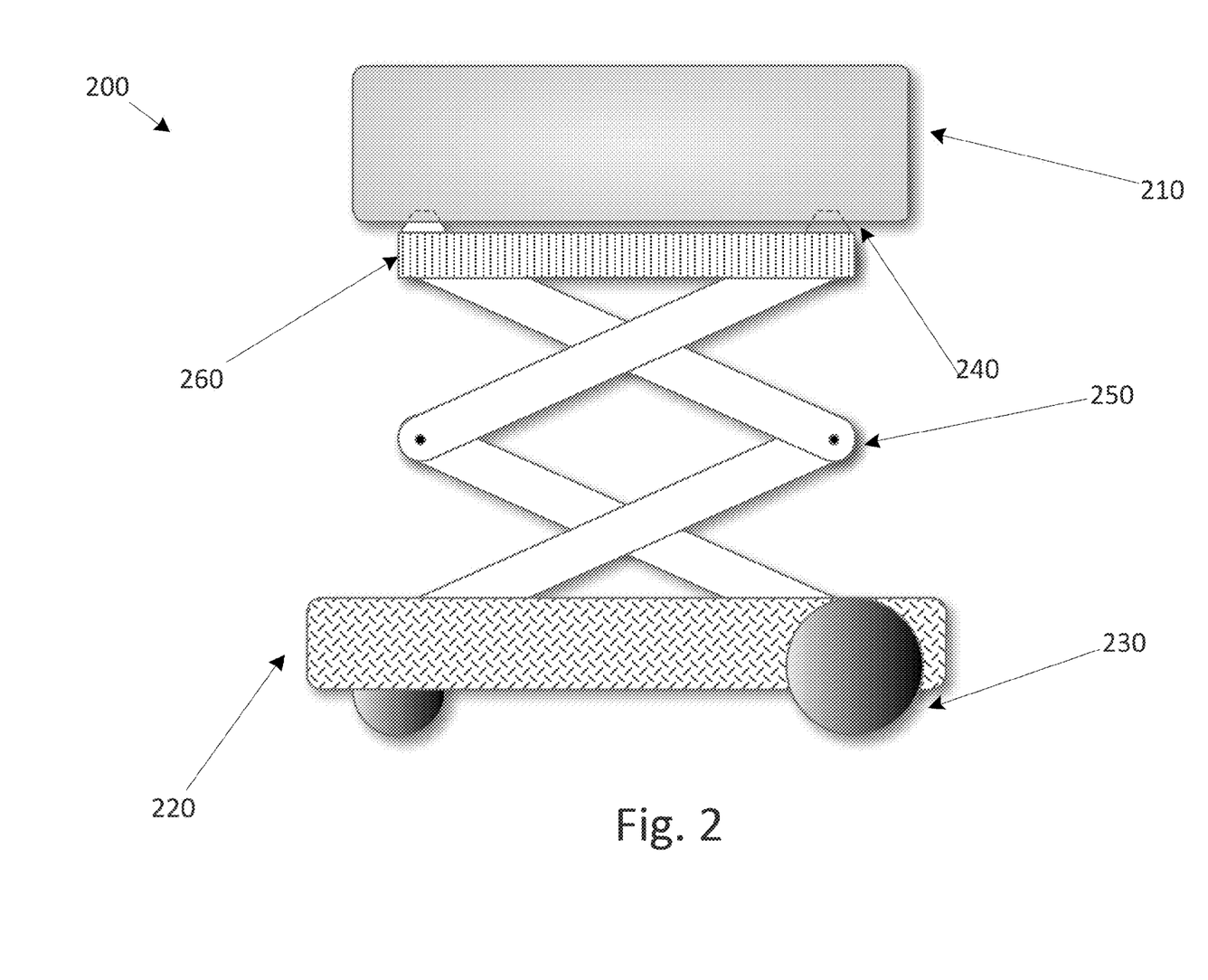
FIG. 2 is a side view of an exemplary, portable robotic unit used in battery removal and replacement, in accordance with some embodiments of the disclosure provided herein.

FIG. 2 is a side view of an exemplary, portable robotic unit 200 used in battery removal and replacement, in accordance with some embodiments of the disclosure. Portable robotic unit 200 comprises battery interface 260, elevation trellis 250, and main body 220 (battery 210 is rendered for didactic purposes). Battery interface 260 engages battery 210 via affixed conic sections 240. In the present embodiment, conic sections 240 are male conical fitments which mate to similar female conical fitments disposed on the underside of battery 210. In other embodiments, these interfacing shapes can be any suitable form, such as, a pins, rods, crosses, etc. or none at all. For example, a border profile enveloping the outer boundary of the battery 210 can be used—none of the proceeding is beyond the scope of the present invention. Simple magnets or electromagnets can also be used to secure battery 210 with the provision of a small amount of ferric substance on the battery 210.

Elevation trellis 250 lifts battery interface 260 from the main body 220, the purpose of which is to reach and interface with batteries, usually disposed underneath a vehicle in a predetermined orientation and location. In the present embodiment, a mechanism similar to a scissor jack is employed as the elevation trellis 250; however, a hydraulic jack, electric motor driven armature, or any suitable extension mechanism can be used. In the present embodiment, wheels 230 propel main body 220 to predetermined and directed locations. However, tracks that are frequently used on automatic robots can easily be substituted in other embodiments.

In some embodiments, main body 220 of portable robotic unit 200 further comprises a suspension, drive motor, sensor and navigation and guidance system, power supply, on-board transceiver interface for user and computer interaction as well as computational means to support these functions.

In embodiments featuring an autonomous mobile robot, main body 220 comprises an on-board computer, a plurality of sensors, a signaling interface a mechanical coupling interface used for recharging its own power supply and wireless communication means. The computer comprises a processor, memory means and a plurality of computer programs for controlling the robot. In the memory are stored digital maps of the present environment, navigation beacons and information of each and every operation module. The memory (and/or programming) also carries ready-to-use strategies for navigation, orientation, maneuvering, and communication as well as strategies for avoiding collisions.

Some, most or all information and data can be preprogrammed. In other instances, information and programs can be supplied by a network, such as a wireless local area network (LAN) or the Internet, either from mobile operations platform 130 or a remote server. The sensors comprise distance measuring means, such as ultrasonic radar, LiDAR, sound measuring means, such as a microphone, and visual measurement system, such as a vision system including optics and an image sensor like an electronic device that is capable of transforming a light pattern (image) into an electric charge pattern, such as a Charge-Coupled-Device (CCD).

The signaling interface comprises protocols for sending and receiving signals, which carry information to and from sensors, operation modules and communication system. These signals are mainly sent on a local network from mobile operation platform 130, which also comprises a wireless network. Thus, a wireless signal comprises a plurality of parts such as address, identity and messages.

The communication means comprises in a first embodiment a transmitter and a receiver for wireless communication. The communication medium is preferably electromagnetic waves but may also comprise sonic or a light communication medium.

Portable robotic unit 200 must be easily operated, without the need for complicated reprogramming. In one embodiment, the robot is responding to spoken commands or commands sent via efficient communication means from a human or another computer or processor unit. In another preferred embodiment, they have extensive on-board computing capacity to be able to work autonomously, making their own decisions without requiring continual instructions and monitoring from an operator.

An autonomous robot of this type is quite sophisticated. Not only is it able to determine where it is, for example by means of an odometer and an accelerometer, calibrated to known fixed points on vehicle 110 and mobile operations platform 130, but it also has a sensor and monitoring system as well as a strategy for avoiding obstacles.

Portable robotic unit 200 preferably comprises an efficient power source, such as an on-board rechargeable battery pack. In a preferred embodiment, the autonomous robot decides on its own to go to a charging station disposed on the mobile operations platform 130 when necessary and/or when not occupied by other tasks.

Portable robotic unit 200 normally has at least three wheels 230 to be able to stand stable in an upright position, similar to a tricycle. In a preferred embodiment, two of these wheels 230 are used for driving and the third wheel is used for steering. In another preferred embodiment, the two wheels 230 are moved separately and the third wheel is freely moveable in all direction in a horizontal plane. By rotating the two driving wheels 230 at different speeds or in a remote direction, the robot is steered by those driving wheels. In this case the third wheel may swivel around a vertical axis. In another embodiment, the third wheel has both a driving and a steering function. In this case the two other wheels are used as tracking and stabilizing wheels. If more wheels 230 are used, it would only result, especially when the ground is not flat, in one of the wheels being out of contact with the ground. If this wheel happens to be one of the driving wheels, portable robotic unit 200 cannot move correctly. This can be avoided by having suspended wheels. In another way this problem is avoided by having horizontal axis functionality between the two pairs of wheels.

Figure 3:
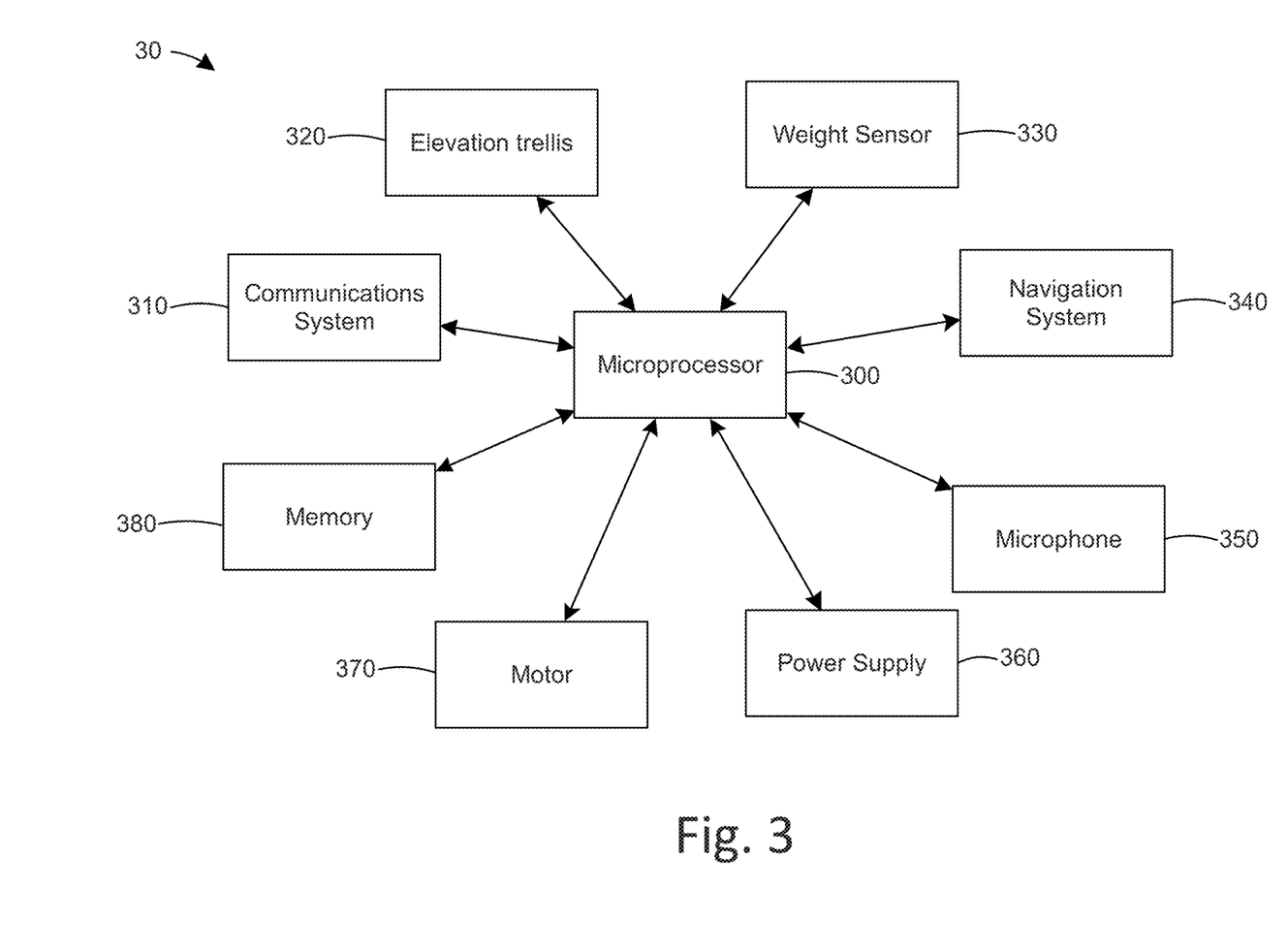
FIG. 3 is a block diagram of an exchange robotic unit, in accordance with some embodiments of the disclosure provided herein.

FIG. 3 is a block diagram of an exchange robotic unit 30. The robotic unit 30 includes a microprocessor 300 in electrical communication with a communications system 310, an elevation trellis 320, a weight sensor 330, a navigation system 340, a microphone 350, a power supply 360, and a memory 370. The communication system 310 includes a transceiver to communicate with the mobile operations platform, with a server over a network (e.g., a LAN, a WAN, the Internet, etc.), and/or with an arriving electric vehicle (or its passenger). The transceiver can be in electrical communication with a radio or other device to provide wireless communication. Through the communications system 310, the robotic unit 30 can receive instructions from the mobile operations platform such as which vehicle to service and/or which battery module in that vehicle needs to be replaced. The robotic unit 30 can also receive software updates over the communications system 310. The robotic unit 30 can also use the communications system 310 to transmit information to a server and/or the mobile operations platform regarding its status (e.g., whether it is idle, busy, or in need of a recharge) and its location (absolute or relative to a vehicle or a navigational landmark or beacon). The robotic unit 30 can also use the communications system 310 to transmit information to a vehicle to coordinate the exchange of battery modules.

The processor 300 is in electrical communication with elevation trellis 320 or other structure that the robotic unit 30 uses to exchange battery modules in a vehicle. By controlling the elevation trellis 320, the robotic unit 30 can raise or lower battery interface 260 during battery exchange. The elevation trellis 320 can be in mechanical communication with a motor or it can be in fluid communication with a pump, such for a hydraulic or pneumatic trellis.

The weight sensor 330 can be disposed on battery interface 260 to sense the weight placed on battery interface 260. If the weight on battery interface 260 is within a certain range, (e.g., 110 to 130 pounds), the processor 300 can determine that a battery module is disposed on battery interface 260 (e.g., if the battery module weighs 120 pounds). Likewise, if the weight on battery interface 260 is less than a certain value (e.g., 20 pounds), the processor 300 can determine that a battery module is not on battery interface 260. The processor 300 can also use the reading of weight sensor 330 during loading and unloading for example as described in FIGS. 4 and 5.

Figure 4:
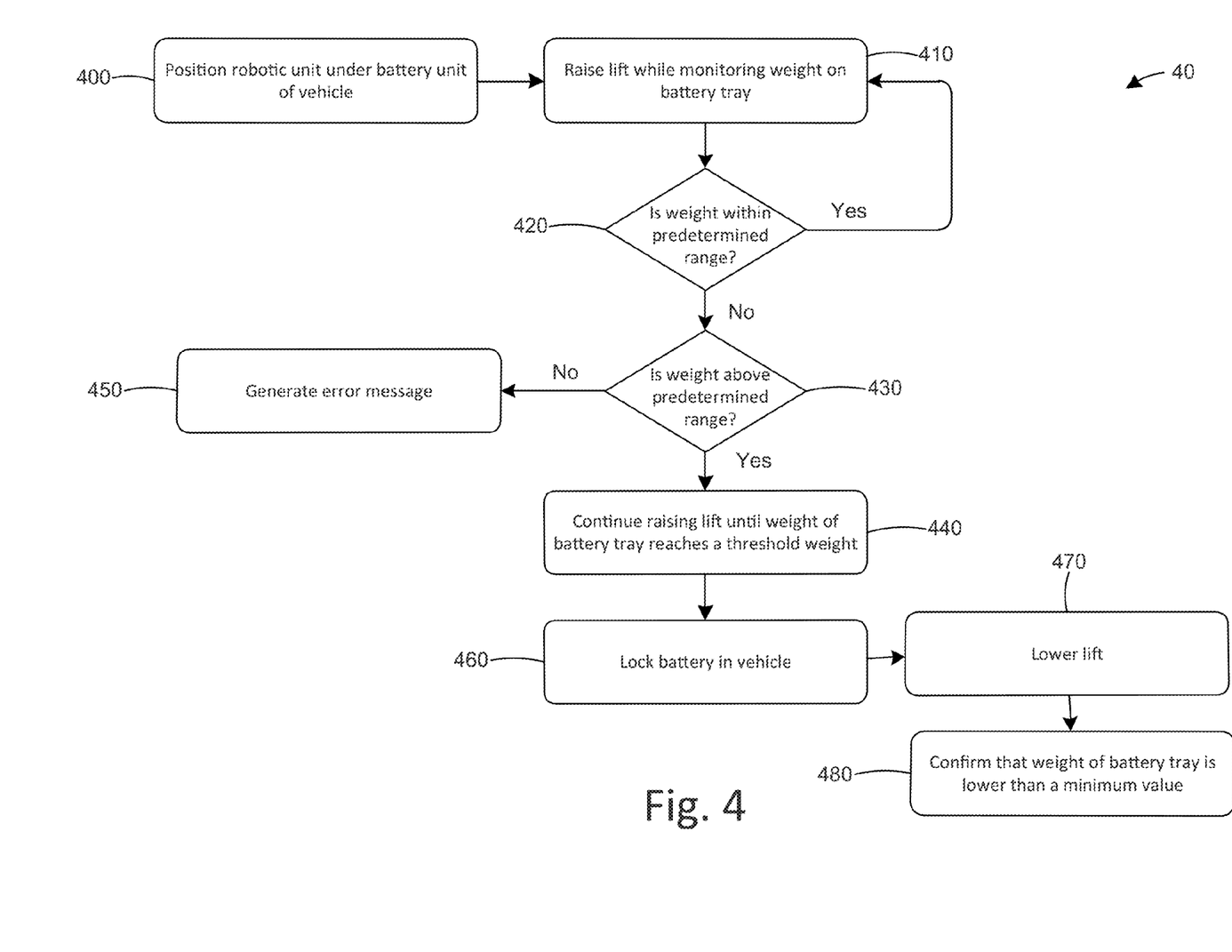
FIG. 4 is a flow chart of a method for loading a charged battery module in a vehicle, in accordance with some embodiments of the disclosure provided herein.

FIG. 4 is a flow chart 40 of a method for loading a charged battery module in a vehicle. In step 400, the robotic unit is positioned under the battery unit of the vehicle, as described herein. In step 410, the robotic unit raises its lift to load the charged battery in the appropriate receptacle of the vehicle's modular battery unit. As the lift is rising, the robotic unit determines the weight on the battery tray or battery interface as sensed by weight sensor 330. At decision point 420, the robotic unit determines if the weight on the battery tray is within a predetermined range, such as 110 pounds to 130 pounds, as discussed above. If yes, flow chart 40 returns to step 410 and the robotic unit continues to raise its lift. If the weight on the battery tray is not within the predetermined range, the flow chart 40 proceeds to decision point 430.

In decision point 430, the robotic unit determines if the weight on the battery tray is above the predetermined range (the same range used for decision point 420). If yes, this indicates that the battery and battery tray have engaged the vehicle, in which case in step 440 the robotic unit continues to raise the lift until the weight on the battery tray reaches a threshold weight. The threshold weight can be from about 10 to about 50 pounds above the weight of the battery. In some embodiments, the threshold weight can be from about 20 to about 40 pounds above the weight of the battery, about 30 pounds above the weight of the battery, or any weight or range there between. For example, if the battery weighs 120 pounds, the threshold weight can be 150 pounds so that the battery tray applies about 30 pounds of force against the vehicle. Returning to decision point 430, if the robotic unit determines if the weight on the battery tray is not above the predetermined range, this may indicate that the battery is no longer on the battery tray (e.g., the battery fell off), in which case the robotic unit generates an error message in step 450.

After the weight on the battery tray reaches the threshold weight, in step 460 the robotic unit sends a message to the vehicle that the battery module is securely placed in the open receptacle of the vehicle's modular battery unit. The vehicle then locks the battery module in the battery unit using a locking mechanism. The robotic unit then lowers the lift in step 480 and confirms that the weight on the battery tray is lower than a minimum value (e.g., 20 pounds). If yes, the robotic unit has successfully loaded the battery in the vehicle. If no, the robotic unit can return to step 400 of flow chart 40 and try again to load the battery. Alternatively, the robotic unit can stop and generate an error message, which can cause a technician to determine the root cause of the problem.

Figure 5:
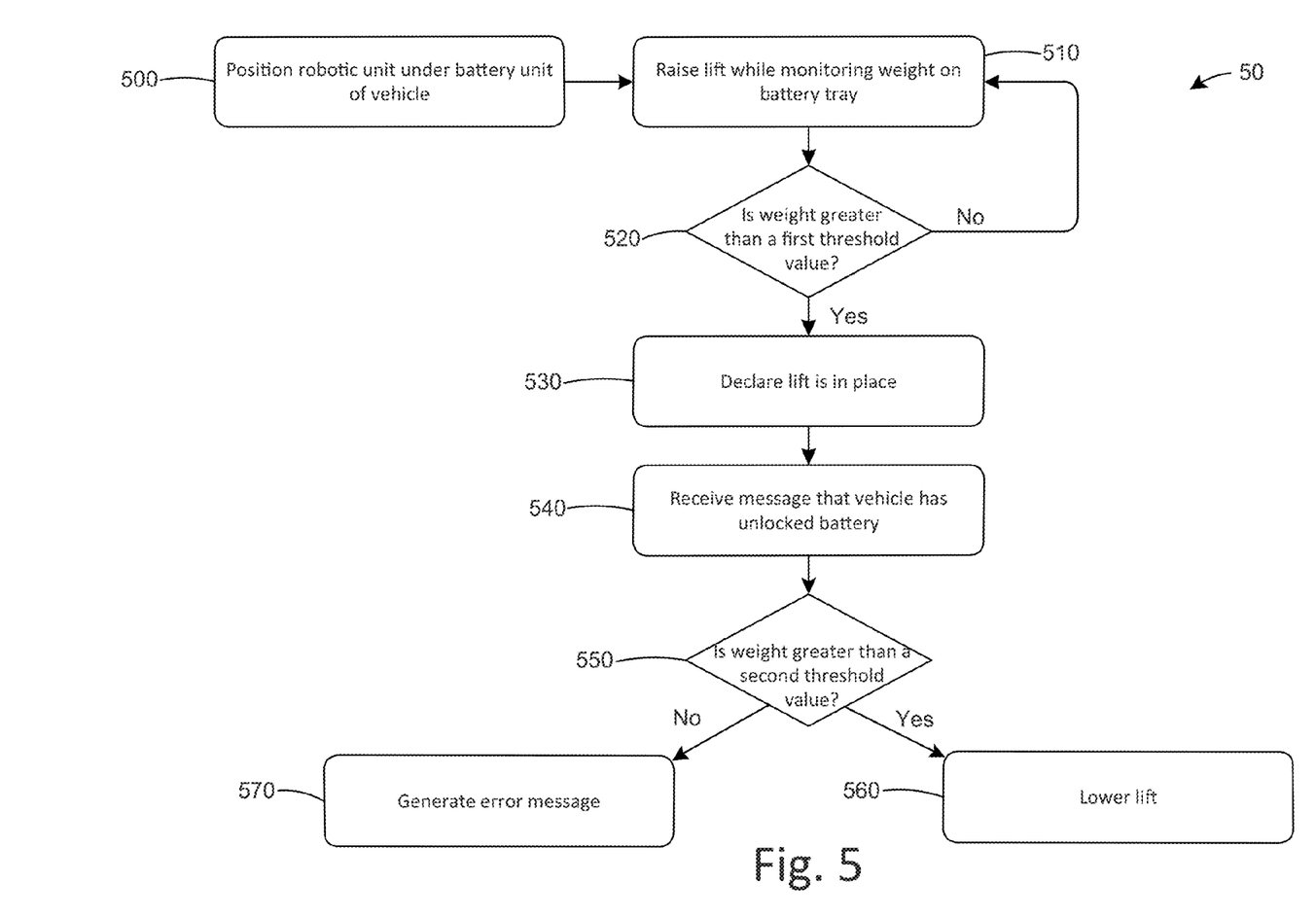
FIG. 5 is a flow chart 50 of a method for unloading a depleted battery module from a vehicle, in accordance with some embodiments of the disclosure provided herein.

FIG. 5 is a flow chart 50 of a method for unloading a depleted battery module from a vehicle. In step 500, the robotic unit is positioned under the battery unit of the vehicle, as described herein. In step 510, the robotic unit raises its lift to unload the depleted battery from the appropriate receptacle of the vehicle's modular battery unit. As the lift is rising, the robotic unit determines the weight on the battery tray or battery interface as sensed by weight sensor 330. At decision point 520, the robotic unit determines if the weight on the battery tray is greater than a first threshold value. The first threshold value corresponds to the weight that indicates that the battery tray is secured against the vehicle. In some embodiments, the first threshold value is 10 pounds to 20 pounds or about 15 pounds. If the weight on the battery tray is less than the first threshold value (i.e., decision point 520 is no), this indicates that the battery tray has not yet engaged with the vehicle. Accordingly, the robotic unit continues to raise the lift and monitoring the weight on the battery tray at step 510. When the weight on the battery tray is greater than the first threshold value (i.e., decision point 520 is yes), the flow chart proceeds to step 530.

In step 530, the robotic unit declares that the lift is in place and engaged with the vehicle. The robotic unit then stops raising the lift and sends a message directly or indirectly to the vehicle to indicate that the lift is in place. The robotic unit can send an indirect message to the vehicle via a server, a local or wide area network, or the mobile operations platform. The vehicle unlocks the depleted battery when it receives the above message from the robotic unit. In step 540, the robotic unit receives a message directly or indirectly from the vehicle that the vehicle has unlocked the battery.

In decision point 550, the robotic unit determines whether the weight on the battery tray is greater than a second threshold value. The second threshold value can be selected so that it indicates that the depleted battery is now resting on the battery tray of the robotic unit. For example, if the first threshold value is 10 pounds and the battery unit weighs 120 pounds, the battery tray should now weigh 130 pounds. The second threshold value can be 10 pounds less than the combined weight of the first threshold value and the battery weight, i.e., 120 pounds in the preceding example. If the weight on the battery tray is greater than or equal to the second threshold value, the robotic unit proceeds to lower the lift at step 560 and return the depleted battery to the appropriate location (e.g., mobile operations platform). If the weight on the battery tray is less than the second threshold value, the robotic unit generates an error message that indicates that the depleted battery either fell off of the battery tray or the battery has not been fully released from the vehicle.

Returning to FIG. 3, the robotic unit also includes a navigation system 340, as described herein. The navigation system 340 can include a distance-measuring module that can include an odometer, ultrasonic radar, and/or a light detection and ranging (LiDAR) system. The navigation system 340 can also include an optical system, which can include video cameras, image sensors, and other optical equipment. The image sensors can be used to detect light patterns, which may be used as navigational beacons and/or for signaling. The optical system can also be used to scan a bar code to identify an object, such as the vehicle or battery modules.

The robotic unit can optionally include a microphone 350 to receive oral commands for example from the vehicle driver. In some embodiments, the robotic unit can also include a speaker that allows the robotic unit to reply or acknowledge the voice command.

The robotic unit also includes a power supply 360, which can include a rechargeable battery. The microprocessor 300 can communicate with the power supply 360 to determine its status. If the power supply 360 is low, the microprocessor may initiate communications with the server and/or the mobile operations platform to coordinate charging or exchanging the power supply 360.

The robotic unit also includes a motor 370 that drives the wheels to move the robotic unit in combination with navigation system 350.

Figure 6:
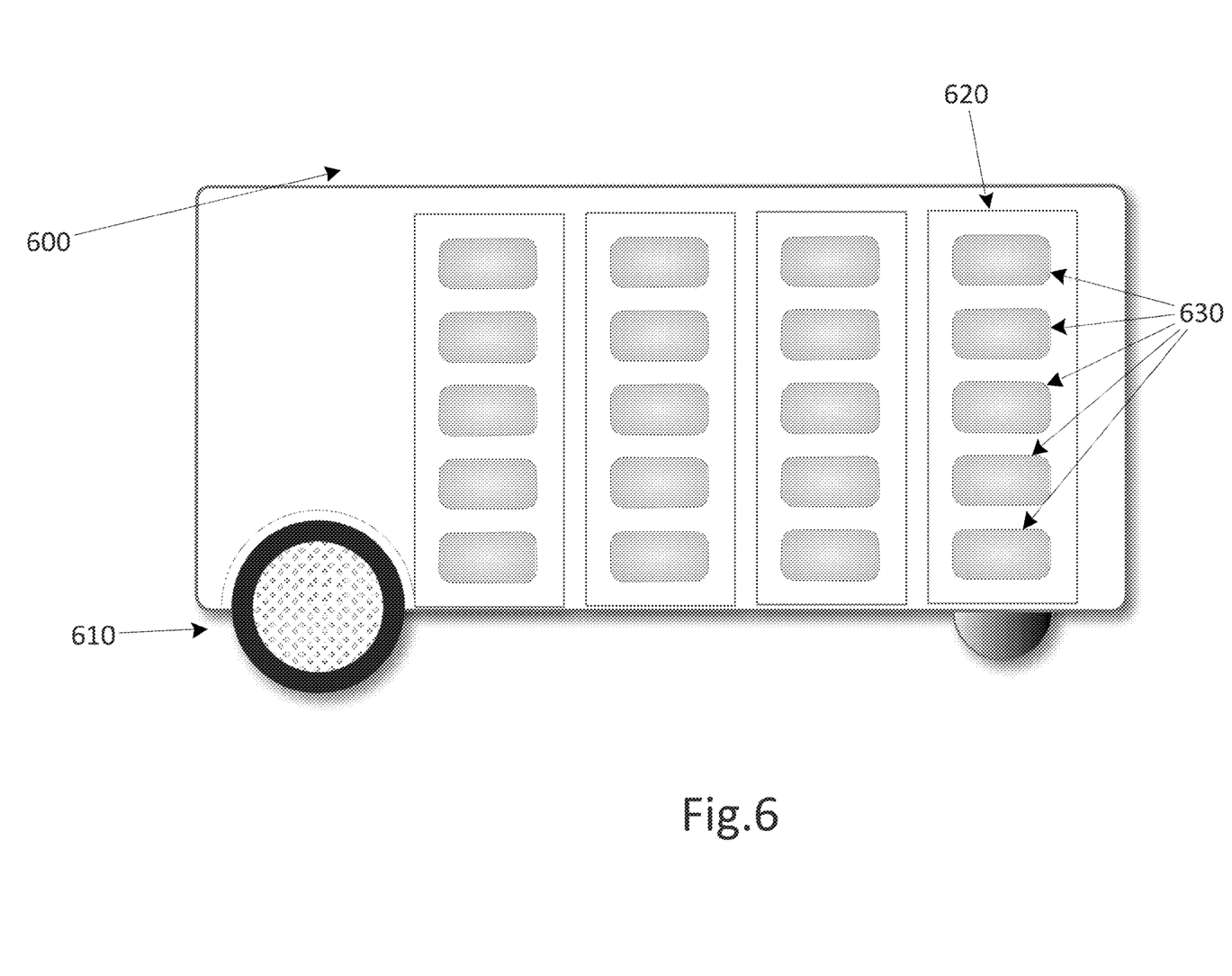
FIG. 6 is a side view of an exemplary, portable primary pod/mobile operation platform used in charging and battery deployment to the portable robotic unit, in accordance with some embodiments of the disclosure provided herein.

The robotic unit also includes a memory 380. The memory 370 can store instructions for the robotic unit to carry out its tasks. The instructions can be interpreted and/or executed depending on the form of the instructions. Memory 370 can also store the locations of navigation beacons FIG. 6 is a side view of an exemplary, portable primary pod/mobile operation platform 600 used in charging and battery deployment to the portable robotic unit 200, in accordance with some embodiments. Portable primary pod 600 comprises battery dispensaries 620 and wheels 610. While portable primary pod 600 is substantially larger than portable robotic unit 200, wheels 610 perform similarly to wheels 230. In some embodiments, the portable primary pod 600 is towed or carried by another robotic vehicle so that the portable primary pod 600 does not need to carry out complex mobility and navigational tasks.

Battery dispensaries 620 contain, store and dispense batteries 630 and/or battery modules, which can be battery cells wired in series for augmenting voltage or in parallel for increasing current specifications. In one embodiment, a modular battery could either be the smallest possible module or could be a combination of smaller units combined and contained in a container. Multiple modular batteries can be combined within an electric car to provide more capacity. Hence, a vehicle might contain one or more modular batteries. In some embodiments, the vehicle batteries are those described in U.S. Pat. No. 9,315,113, entitled "Electric Vehicle Battery Systems with Exchangeable Parallel Electric Vehicle Battery Modules," issued on Apr. 19, 2016, which is hereby incorporated by reference.

The succeeding describes how the robot assisted modular battery interchanging system works in operation. Upon arriving, an electric vehicle with depleted batteries, at least in part, parks near a battery pod. Given the present invention is portable and no special permanent fixtures are necessary, this operation can be performed in a simple parking lot. To have its battery replaced the following sequence of events takes place to swap the electric car's battery modules with fully charged ones.

The car, automatically or with assistance from the driver, establishes a wireless communication link with the battery pod and sends its unique identifier ID to the battery pod over the wireless link. The battery pod communicates with the central server to send the newly arrived car's ID. In turn, battery pod receives information about the eligibility of the car for battery swapping, information about how the batteries are distributed within the car, and the exact coordinates of the batteries relative to discoverable reference points along the car's body.

The battery pod transmits to the robot the information about the identity of the car, the location of the various modular batteries relative to the car reference point and which battery module the robot should pick up. The robot uses its previously-described relative position sensing technology to locate itself relative to the car. Using its location relative to a fixed point on the car, the battery distribution map received from the pod, and the instruction on which exact battery to collect, the robot positions itself exactly under a first predetermined battery.

Once the robot is in position, it notifies the battery pod, which instructs the car to release the battery module. Battery module is affixed to the car via a battery module attachment. A car compatible with this system will be equipped with a car battery module attachment, which will allow for the installation of the modular battery into the car and the establishment of all power and communication connections. The attachment can be a magnetic or an electro-mechanical latch or other suitable mating configurations well known in the art.

The robot moves the depleted battery module to the battery pod, retrieves a new battery module and then installs it into the car. The pod repeats the preceding steps instructing the robot to replace a different battery module in the car each time until all battery modules are replaced. However, if additional robots are available, two or more battery modules can be replaced in parallel. Once the robot(s) return to the pod and receives confirmation from the pod that all batteries have been replaced, the operation is complete.

Figure 7:
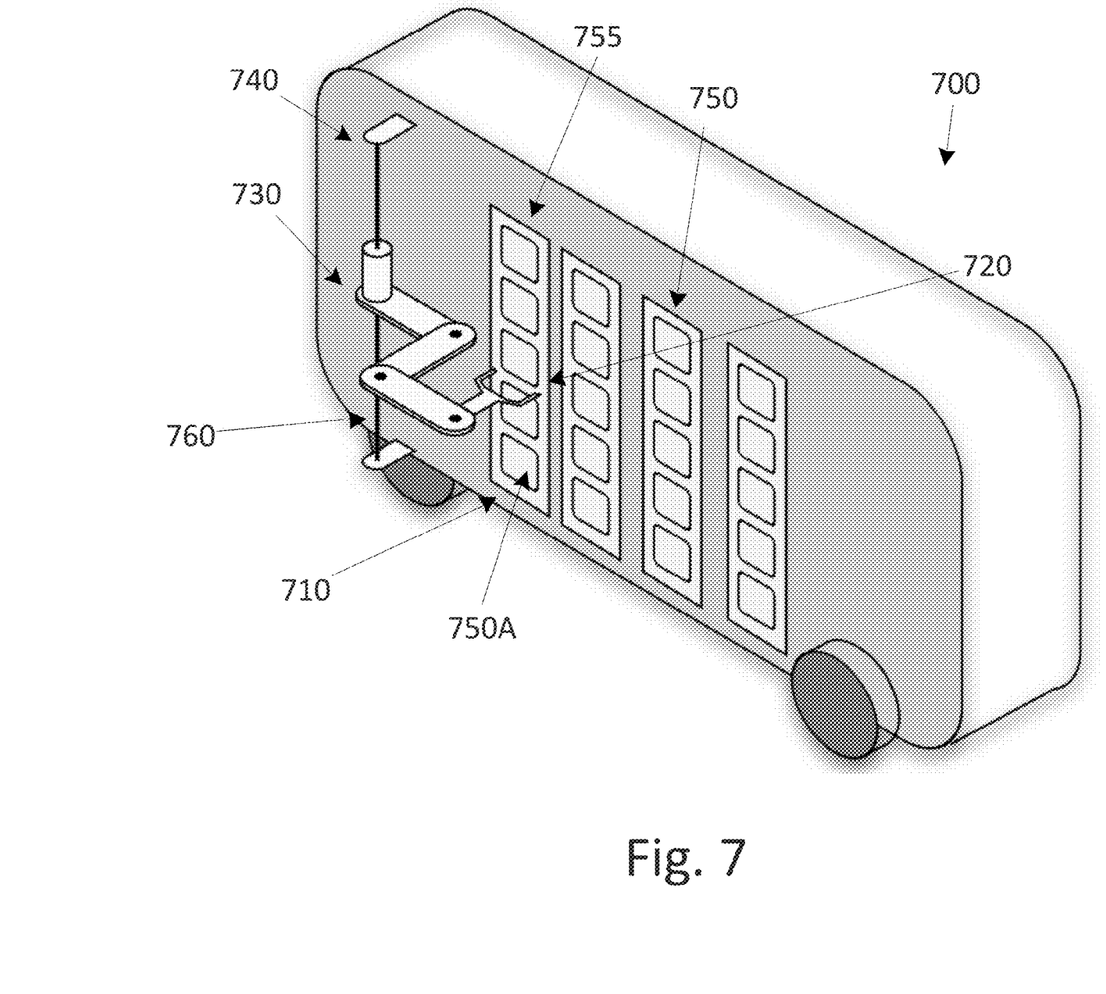
FIG. 7 is an isometric projection of a combined primary pod/robotic unit, in accordance with an alternative embodiment of the disclosure provided herein.

FIG. 7 is an isometric projection of a combined primary pod/robotic unit 700, in accordance with an alternate embodiment. Combined primary pod/robotic unit 700 comprises battery dispensaries 410 and robotic arm 730 which is mechanically coupled to combined primary pod/robotic unit 700 by bracket 740.

The present embodiment can be programmed to perform substantially similar operations as prior embodiments; however, the computational capacity, programming, sensor array and all communications are executed by combined primary pod/robotic unit 700 itself, akin to an automatic robot (as opposed to autonomous as previously delineated). Robotic arm 740 maintains numerous degrees of freedom suitable for changing a variegated array of battery module dispositions.

Robotic arm 740 traverses bracketed stanchion 760, moving in a direction orthogonal to the ground and selects battery module 750. Robotic arm 740 is configured to move the end mechanical effector 720 in three degrees of motion. A mechanical effector 720 comprises a mechanical coupling to dock with battery module(s) 750. In a first embodiment, the mechanical effector 720 comprises a gripping means on which the battery module 750 is coupled.

In another embodiment, the mechanical effector 720 comprises a hitch frame, which in one embodiment is rotatable around an axis normal to the longitudinal axis of the robot. In yet another embodiment, mechanical effector 720 also comprises an elevator trellis for additional lift to dispose batteries into position underneath a car. However, in the present embodiment, battery arrays can have any configuration, including under a hood or truck area. In one embodiment, robotic arm 740 and mechanical effector 720 are hydraulically powered. In other embodiments, they are electrically or electro-mechanically (or other suitable means) powered and operated.

In some embodiments, the robotic arm 740 takes battery module 750A from the bottom of a vertical stack 755 of similar charged battery modules. When the bottom battery module 750A is removed, the battery modules in the vertical stack 755 disposed above the bottom battery module 750A move down. Thus, the new bottom battery module is the battery module that was disposed immediately above the bottom battery module 750A. The process of taking the bottom battery module can continue until all charged modules from the vertical stack 755 have been deployed. The depleted battery modules (replaced by charged modules from stack 755) can be stored in the vertical stack 755. After all charged modules have been deployed, only depleted modules remain in the vertical stack 755. The vertical stack 755 can then be removed and the battery modules can be charged together or separately.

Presumably, a car would have to be positioned closer to combined primary pod/robotic unit 700 compared to previous embodiments. However, combined primary pod/robotic unit 700 could have navigation and mobility similar to those describe in the forgoing by utilizing built-in sensors and a collision avoidance system to be able to perform in an environment with moving people and objects. In another embodiment, speech recognition could be employed providing a service atmosphere tantamount to a drive-in window.

Figure 8:
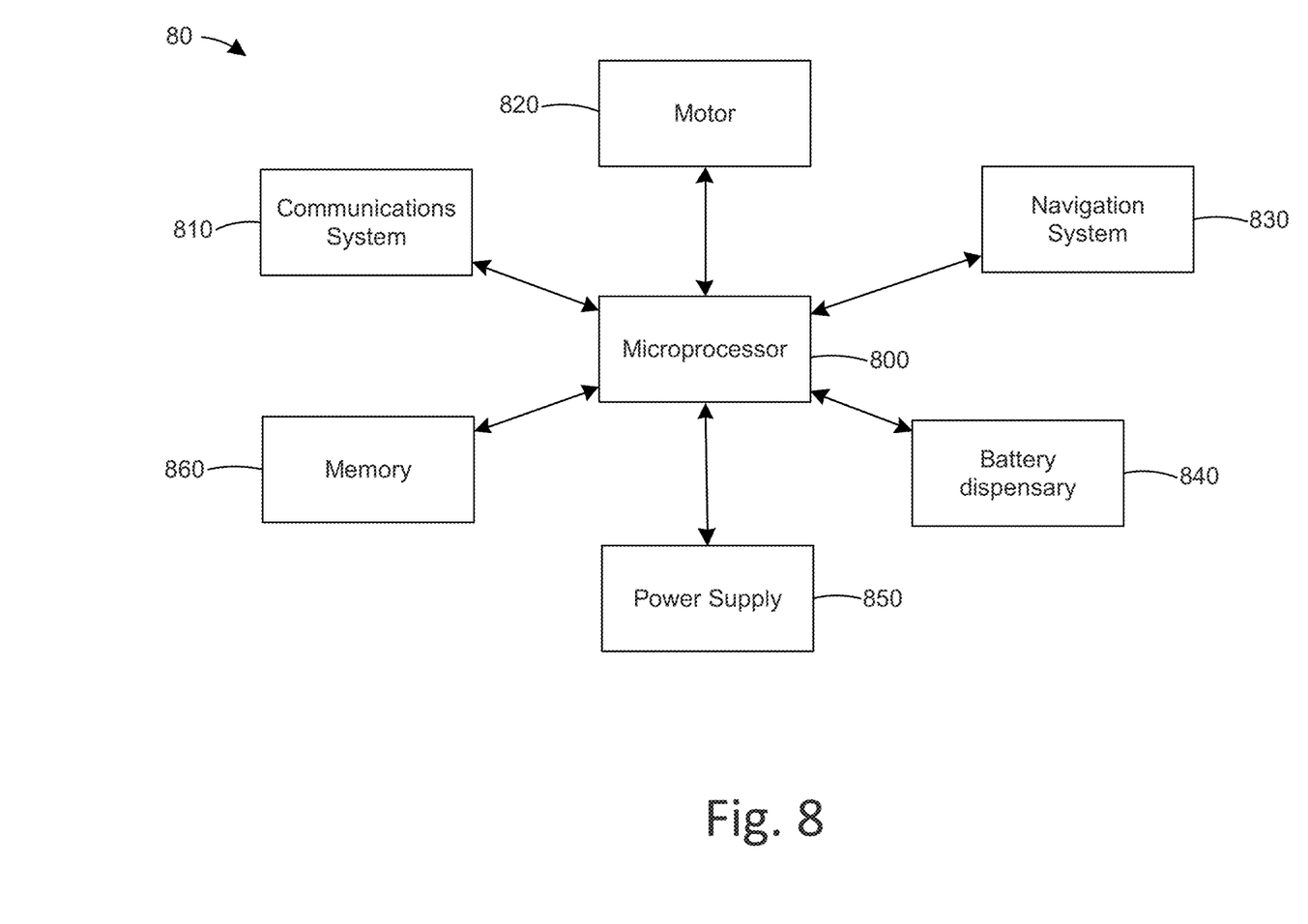
FIG. 8 is a block diagram of a battery pod/mobile operation platform, in accordance with an alternative embodiment of the disclosure provided herein.

FIG. 8 is a block diagram of a battery pod/mobile operation platform 80. The battery pod 80 includes a microprocessor 800 in communication with a communication system 810, a motor 820, navigation system 830, battery dispensary 840, power supply 850, and memory 860. The communication system 810, motor 820, navigation system 830, power supply 850, and memory 860 can be the same or similar to like components described herein, for example with respect to FIG. 3. The battery dispensary 840 can include an electrical and/or an optical sensor to determine the status of each dispensary receptacle. The electrical sensor can be in electrical communication with each battery in the dispensary, for example through a port or jack on each battery. Using the electrical sensor, the processor 800 can determine the status (e.g., depleted, charged, broken) and location of each battery and the location of any dispensary receptacles that do not hold a battery. The optical sensor can also determine the location of any dispensary receptacles that do not hold a battery. Alternatively, if the batteries are stacked on top of each other, such as in a column, the dispensary 840 can include a weight sensor to determine the number of batteries in a given stack.

Battery pod 80 can also include one or more motors to control a robotic arm (e.g., robotic arm 740) as described above. The motors can be in communication with microprocessor 800.

Figure 9:
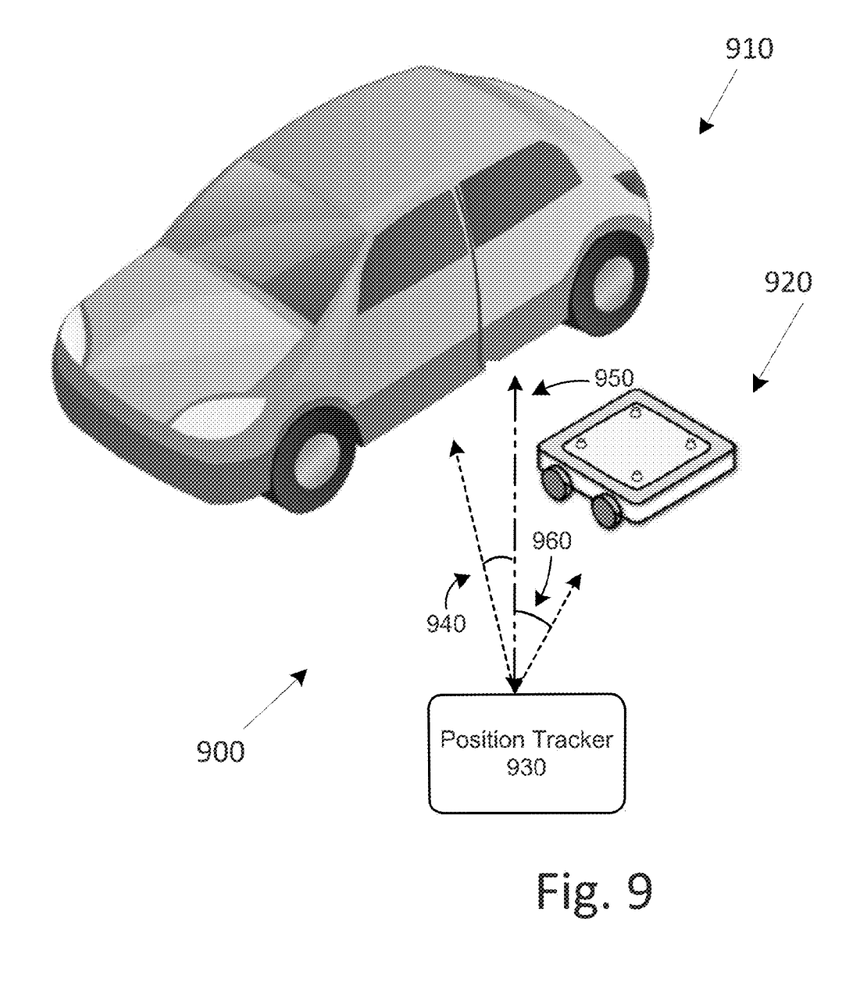
FIG. 9 projects an isometric view of a robot assisted modular battery interchanging system, in accordance with some embodiments of the present disclosure.

FIG. 9 projects an isometric view of a robot assisted modular battery interchanging system 900, in accordance with some embodiments of the present disclosure. The system includes a portable exchange mobile robot 920 and a position tracker 930. As discussed above, robot 920 is configured to load and unload batteries (or battery modules or battery trays) from vehicle 910 (e.g., an electric or a hybrid vehicle). For example, robot 920 removes depleted batteries (or battery modules) from vehicle 910 and loads charged batteries (or battery modules) into vehicle 910.

Position tracker 930 is configured to "see" the vehicle 910 and robot 920 using one or more technologies. By "seeing" the vehicle 910 and robot 920, the position tracker 930 can determine their relative positions. In general, the relative positions are determined with respect to position tracker 930. For example, position tracker 930 may determine that vehicle 910 is located at a distance 75 feet away from position tracker 930 at a first relative angle 940 of −15 degrees with respect to an arbitrary reference axis 950. Continuing with the example, position tracker 930 may determine that robot 920 is located at a distance 30 feet away from position tracker 930 at a second relative angle 960 of +30 degrees with respective to reference axis 950. Using the relative positions of vehicle 910 and robot 920 (i.e., respective distances and relative angles), the position tracker 930 determines the relative position of vehicle and 910 and robot 920 with respect to each other. For example, the position tracker 930 may determine that vehicle 910 is 45 feet from robot 920 at an angle of −45 degrees with respect to reference axis 950. The position tracker 930 can then send that the relative position information to robot 920 (e.g., wirelessly such as in a Bluetooth or WiFi network), which can use that information to navigate to the vehicle 910 and to the target battery/battery module/battery tray in the vehicle 910. This system can improve the robots' navigation as the vehicles can be disposed in varying positions, for example due to the location at which the driver parks the vehicle.

In some embodiments, the position tracker 930 can determine the location of the robot 920 while the robot 920 is located underneath the vehicle to assist the robot 920 in locating the battery/battery module/battery tray to be exchanged.

The position tracker 930 can determine the location of the battery/battery module/battery tray by identifying the certain features of the vehicle 910 (e.g., front and back), the make/model of the vehicle 910, and known information about the location of the battery units in the vehicle 910. For example, the position tracker 930 can determine (e.g., through a camera and a database) that vehicle 910 is a TESLA® Model S, which has a battery unit located three feet behind the front bumper of the vehicle. The position tracker 930 can send that information, including the relative location (with respect to robot 920) of the front bumper and/or of the battery unit of the vehicle to robot 920.

In some embodiments, the position tracker 930 includes a camera and a LiDAR system. The position tracker 930 can use the camera to detect the position of the vehicle 910 and the LiDAR system to detect the contour (and hence position) of the robot 920. In some embodiments, the vehicle 910 includes a plate, a sign, a visual marker, or other visual identifier that can be detected by the camera in position tracker 930. The visual identifier can be used by position tracker 930 as the point on the vehicle 910 for which to determine the relative position. In addition, the visual identifier can be disposed at a predetermined location with respect to the battery unit of the vehicle, which the position tracker 930 can use to guide the robot 920 to the battery unit. For example, the visual identifier can be on the side of the vehicle 910 transverse from the battery unit (i.e., at the same distance with respect to the front or rear of the vehicle as the battery unit).

In some embodiments, the vehicle 910 and/or the robot 920 generates electromagnetic signals that can be detected by position tracker 930 to determine the respective relative position of vehicle 910 and/or the robot 920. The electromagnetic signal can be a radio signal (e.g., a microwave signal) or a light signal. Alternatively, the position tracker 930 can generate electromagnetic signals that can be detected by the vehicle 910 and/or the robot 920, which can communicate the detection information (or calculations made therefrom) back to position tracker 930 to determine the relative positions of the vehicle 910 and the robot 920.

In some embodiments, the position tracker 930 includes a radar system, such as an ultrasonic radar system, to determine the location of the vehicle 910 and/or the robot 920. The position tracker 930 can include any of the foregoing position techniques and technologies, such as both ultrasonic radar and a camera.

In some embodiments, the position tracker 930 can be combined with the portable primary pod/mobile operation platform described above.

Aspects of the technology described herein are explained in the context of robotics, automotive technology and electro-chemistry, but it should be appreciated that the technology described herein is useful for and may be applied in other settings. For example, the technology described herein may be used in an alternative energy environment. Specifically, the technology described herein may be applicable to other suitable vehicles, such as, busses, farming equipment, military vehicles, motorcycles and scooters.

The aspects and embodiments described above, as well as additional aspects and embodiments, are described further below. These aspects and/or embodiments may be used individually, all together, or in any combination of two or more, as the technology described herein is not limited in this respect.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto; inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as computer mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein. The present materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

What is claimed is:

1. A portable exchange robot for exchanging a modular battery unit from a modular battery in a vehicle, said modular battery comprising one or more modular battery units, said robot comprising:
   a microprocessor;
   a battery tray configured to hold at least one of said modular battery units;
   a lift in mechanical communication with said battery tray, said lift to raise and lower said battery tray;
   a motor in mechanical communication with said lift and in electrical communication with said microprocessor, said motor to raise and lower said lift;
   a plurality of wheels that propel said portable exchange robot;
   a navigation system in electrical communication with said microprocessor and at least one of said plurality of wheels to drive the dispensary robot between a modular battery dispensary and a vehicle;
   a wireless communication system operable to be in electrical communication with said modular battery dispensary and said vehicle; and
   a memory in electrical communication with said microprocessor, said memory storing instructions that cause:
   (i) positioning said robot under a depleted modular battery unit in said vehicle based, at least in part, on (a) an identity of said vehicle, (b) a distribution map of the modular battery unit or units, including said depleted modular battery unit, in said vehicle relative to a vehicle reference point, and (c) an identity of said depleted modular battery unit to be exchanged;
   (ii) unloading said depleted modular battery unit from said modular battery in said vehicle, said instructions for unloading said depleted modular battery unit comprising:
      (A) raising said battery tray to engage said depleted modular battery unit;
      (B) monitoring a weight on said battery tray during said raising, said weight sensed by a weight sensor on or proximal to said battery tray;
      (C) stopping said raising when said monitored weight reaches a threshold value; and
      (D) after said stopping, sending a message to said vehicle that said battery tray has engaged said depleted modular battery unit; and (iii) returning said depleted modular battery unit to said modular battery dispensary.

2. The portable exchange robot of claim 1, wherein said instructions for unloading said depleted modular battery unit further comprise:
receiving an unlock message from said vehicle, said unlock message indicating that said vehicle has unlocked said depleted modular battery unit from said modular battery;
measuring said weight on said battery tray after receiving said unlock message; and
lowering said battery tray if said weight on said battery tray after receiving said unlock message is greater than a second threshold value.

3. The portable exchange robot of claim 1, wherein said navigation system of said portable exchange robot includes ultrasonic radar or LiDAR.

4. The portable exchange robot of claim 3 wherein said navigation system further includes an optical system having an image sensor.

5. The portable exchange robot of claim 1, wherein said battery tray includes male conical fitments that mate to corresponding female conical fitments disposed on an underside of said at least one of said modular battery units.

6. The portable exchange robot of claim 1, wherein said lift includes an elevation trellis.

7. The portable exchange robot of claim 1, wherein said instructions for unloading said depleted modular battery unit further comprise:
raising said battery tray to engage said depleted modular battery unit;
receiving an unlock message from said vehicle, said unlock message indicating that said vehicle has unlocked said depleted modular battery unit from said modular battery;
measuring a weight on said battery tray after receiving said unlock message said weight measured by a weight sensor on or proximal to said battery tray; and
lowering said battery tray if said weight on said battery tray after receiving said unlock message is greater than a threshold value.

8. The portable exchange robot of claim 1, wherein said memory further stores instructions for transmitting status information to said modular battery dispensary, said status information comprising a status of said portable exchange robot.

9. The portable exchange robot of claim 1, wherein said memory further stores instructions for transmitting a location of said portable exchange robot to said modular battery dispensary.

10. The portable exchange robot of claim 1, wherein said location comprises a relative location.

11. The portable exchange robot of claim 10, wherein said relative location is relative to said vehicle.

12. The portable exchange robot of claim 10, wherein said relative location is relative to a navigational landmark or beacon.

* * * * *